(12) United States Patent
Costabeber

(10) Patent No.: US 10,766,243 B2
(45) Date of Patent: *Sep. 8, 2020

(54) CARTRIDGE FOR A STEREOLITHOGRAPHIC MACHINE, STEREO-LITHOGRAPHIC MACHINE COMPRISING SAID CARTRIDGE AND METHOD OF MANUFACTURING SAID CARTRIDGE

(71) Applicant: DWS S.R.L., Zane (IT)

(72) Inventor: Ettore Maurizio Costabeber, Zane (IT)

(73) Assignee: DWS S.R.L., Zane'(VI) (IT)

( * ) Notice: Subject to any disclaimer, the term of this patent is extended or adjusted under 35 U.S.C. 154(b) by 507 days.

This patent is subject to a terminal disclaimer.

(21) Appl. No.: 15/368,050

(22) Filed: Dec. 2, 2016

(65) Prior Publication Data
US 2017/0136710 A1    May 18, 2017

Related U.S. Application Data

(63) Continuation of application No. 14/396,171, filed as application No. PCT/IB2013/001621 on Jul. 25, 2013, now Pat. No. 9,555,584.

(30) Foreign Application Priority Data

Jul. 27, 2012  (IT) ................ VI2012A0183

(51) Int. Cl.
*B65B 3/04*   (2006.01)
*B65B 7/16*   (2006.01)
(Continued)

(52) U.S. Cl.
CPC ............ *B33Y 40/00* (2014.12); *B29C 64/124* (2017.08); *B29C 64/259* (2017.08); *B29C 64/40* (2017.08);
(Continued)

(58) Field of Classification Search
CPC ...... B29C 64/20; B29C 64/106; B29C 64/124; B29C 64/40
See application file for complete search history.

(56) References Cited

U.S. PATENT DOCUMENTS 4,575,330 A    3/1986 Hull
4,752,498 A    6/1988 Fudim
(Continued)

FOREIGN PATENT DOCUMENTS

EP    1 852 244 A2    11/2007
EP    2 463 081 A1    6/2012
(Continued)

OTHER PUBLICATIONS

PCT International Search Report, dated Jan. 2, 2014, corresponding to International Application No. PCT/IB2013/001621.
(Continued)

*Primary Examiner* — Xiao S Zhao
*Assistant Examiner* — Emmanuel S Luk
(74) *Attorney, Agent, or Firm* — Volpe and Koenig, P.C.

(57) ABSTRACT

A cartridge for a stereolithography machine, including a container provided with an access opening, a reservoir for containing a base material, liquid or pasty, suited to be solidified through exposure to a predefined radiation, said reservoir being permanently associated with said container, feeding means suited to feed said base material from said reservoir towards said container, characterized in that the bottom of said container is at least partially transparent to said predefined radiation and is situated opposite said access opening.

16 Claims, 2 Drawing Sheets

(51) Int. Cl.
  *B33Y 40/00*   (2020.01)
  *B29C 64/40*   (2017.01)
  *B29C 64/124*  (2017.01)
  *B29C 64/259*  (2017.01)
  *B33Y 30/00*   (2015.01)
  *B65B 7/00*    (2006.01)

(52) U.S. Cl.
  CPC ............ *B33Y 30/00* (2014.12); *B65B 3/04* (2013.01); *B65B 7/00* (2013.01); *B65B 7/16* (2013.01)

(56) References Cited

U.S. PATENT DOCUMENTS

| | | | |
|---|---|---|---|
| 5,009,585 A | 4/1991 | Hirano et al. | |
| 5,089,185 A | 2/1992 | Hirano et al. | |
| 5,137,662 A | 8/1992 | Hull et al. | |
| 5,143,663 A | 9/1992 | Leyden et al. | |
| 5,164,128 A | 11/1992 | Modrek et al. | |
| 5,217,653 A | 6/1993 | Mashinsky et al. | |
| 5,238,639 A | 8/1993 | Vinson et al. | |
| 5,345,391 A | 9/1994 | Hull et al. | |
| 5,506,607 A * | 4/1996 | Sanders, Jr. | B41J 2/01 118/695 |
| 5,525,051 A | 6/1996 | Takano | |
| 5,573,721 A * | 11/1996 | Gillette | B29C 41/12 264/401 |
| 6,051,179 A | 4/2000 | Hagenau | |
| 6,399,010 B1 * | 6/2002 | Guertin | G05B 19/4099 264/308 |
| 7,052,263 B2 | 5/2006 | John | |
| 7,892,474 B2 | 2/2011 | Shkolnik et al. | |
| 8,372,330 B2 | 2/2013 | El-Siblani et al. | |
| 8,926,304 B1 | 1/2015 | Chen | |
| 2001/0048183 A1 | 12/2001 | Fujita | |
| 2002/0153640 A1 | 10/2002 | John | |
| 2003/0205849 A1 * | 11/2003 | Farnworth | B33Y 10/00 264/401 |
| 2008/0053998 A1 * | 3/2008 | Hochsmann | B29C 64/153 220/287 |
| 2008/0113293 A1 * | 5/2008 | Shkolnik | B33Y 10/00 430/270.1 |
| 2009/0020901 A1 * | 1/2009 | Schillen | B29C 70/88 264/31 |
| 2009/0196946 A1 | 8/2009 | Kihara et al. | |
| 2009/0236778 A1 | 9/2009 | Boot et al. | |
| 2009/0289384 A1 | 11/2009 | Maalderink et al. | |
| 2009/0309267 A1 | 12/2009 | Boot et al. | |
| 2010/0320648 A1 | 12/2010 | Jamar et al. | |
| 2011/0001272 A1 | 1/2011 | Honda et al. | |
| 2012/0106150 A1 | 5/2012 | Vaes et al. | |
| 2012/0195994 A1 | 8/2012 | El-Siblani et al. | |
| 2013/0241114 A1 * | 9/2013 | Ravich | B33Y 10/00 264/401 |
| 2013/0270746 A1 | 10/2013 | Elsey | |
| 2013/0292862 A1 * | 11/2013 | Joyce | B29C 64/35 264/40.1 |
| 2013/0337100 A1 | 12/2013 | Costabeber | |
| 2014/0027953 A1 * | 1/2014 | Costabeber | B33Y 10/00 264/401 |
| 2014/0085620 A1 | 3/2014 | Lobovsky et al. | |
| 2014/0191442 A1 | 7/2014 | Elsey | |
| 2014/0339741 A1 | 11/2014 | Aghababaie et al. | |
| 2014/0361463 A1 | 12/2014 | DeSimone et al. | |
| 2015/0019000 A1 | 1/2015 | Nakamura | |
| 2015/0042016 A1 * | 2/2015 | Costabeber | B33Y 10/00 264/401 |
| 2015/0064298 A1 | 3/2015 | Syao | |
| 2015/0070674 A1 * | 3/2015 | Costabeber | B29C 64/20 355/67 |
| 2015/0123319 A1 | 5/2015 | Fortunato et al. | |
| 2015/0151489 A1 | 6/2015 | Elsey | |
| 2015/0165678 A1 | 6/2015 | Ding et al. | |
| 2016/0067921 A1 * | 3/2016 | Willis | B29C 64/124 264/401 |
| 2018/0148378 A1 * | 5/2018 | Mayr | A61C 13/0013 |

FOREIGN PATENT DOCUMENTS

| | | |
|---|---|---|
| JP | H02 15333 U | 1/1990 |
| WO | WO 2004/044816 A1 | 5/2004 |

OTHER PUBLICATIONS

PCT Written Opinion of the International Searching Authority, dated Jan. 2, 2014, corresponding to International Application No. PCT/IB2013/001621.

PCT International Preliminary Report on Patentablity, dated Jan. 27, 2015, corresponding to International Application No. PCT/IB2013/001621.

Espacet—Bibliographic data for JPH0215333 (U) indicating that abstract is not available.

* cited by examiner

CARTRIDGE FOR A STEREOLITHOGRAPHIC MACHINE, STEREO-LITHOGRAPHIC MACHINE COMPRISING SAID CARTRIDGE AND METHOD OF MANUFACTURING SAID CARTRIDGE

This application is a continuation of U.S. application Ser. No. 14/396,171, filed Oct. 22, 2014, which is a § 371 application claiming priority of International Application No. PCT/IB2013/001621,filed Jul. 25, 2013 which is incorporated herein by reference.

The present invention concerns an interchangeable cartridge for a stereolithography machine. As is known, the stereolithography technique makes it possible to produce a three-dimensional object by superimposing a plurality of layers of a base material, liquid or pasty, that is solidified through exposure to a predefined radiation, generally of the luminous type.

A stereolithography machine of the known type comprises a container suited to contain the base material, the bottom of which is generally transparent to the predefined radiation.

The machine also comprises means suited to emit said predefined radiation, arranged under the container, which selectively solidify the layer of base material that is adjacent to the bottom of the container.

The solidified layers are supported by a modelling platform, powered in the vertical direction so that it is possible to arrange the last solidified layer adjacent to said layer of base material before it solidifies.

The stereolithography machines of the known type pose the drawback that they require that the container be periodically topped up, so as to restore the level of the base material that is consumed during the process.

If said topping up operation is carried out manually, there is the drawback that the operator must be exposed to the base material, with consequent risks deriving from the possible toxicity of the latter.

According to a known variant embodiment, the topping up operation is carried out automatically but in this case the stereolithography machine must be provided with a feeding device, which involves a cost and requires maintenance.

A further drawback of the machines constructed according to this variant embodiment derives from the fact that, when it is necessary to change the base material, said feeding device must be washed in such a way as to avoid any contamination between the old and the new base material.

In any case, the machines described above pose the further drawback that the base material that remained in the container at the end of the processing cycle is exposed to the atmospheric agents, in particular to the air and light of the surrounding environment, with the consequence that it progressively deteriorates until it becomes unusable.

To avoid said deterioration, it is necessary to manually transfer the remained material into a container and keep it there until it is used again.

However, this operation poses drawbacks that are analogous to those already described with regard to the manual topping up of the container.

A further drawback posed by the stereolithography machines of the known type is connected to the fact that, during the processing cycle, the transparent bottom of the container is exposed to the predefined radiation and thus progressively becomes opaque.

Said opacifying action progressively reduces the effectiveness of the radiation, until it becomes necessary to replace the container.

The determination of the time when it is necessary to carry out said replacement requires a certain amount of expertise.

The difficulties related to the topping up and emptying of the container, the periodical replacement of the container and the possible washing of the feeding system mean that a machine of the type described above is not suited to be used by an inexpert user.

Document EP 1852244 discloses a disposable liquid build material feed cartridge for use in solid imaging, while document JP H0215333 discloses a stereolithography machine having a reservoir connected to an external container.

The present invention aims to overcome all the drawbacks which are typical of the stereolithography machines of the known type described above.

In particular, it is a first object of the invention to eliminate the need to periodically top up and/or empty the container.

It is a further object of the invention to avoid the need to wash the container feeding system.

It is also the object of the invention to facilitate the replacement of the container when the bottom of the container has become opaque.

It is another, yet not the least object of the invention to avoid the deterioration of the base material that has remained at the end of the processing cycle.

The above mentioned objects are achieved by a cartridge for a stereolithography machine as described hereinafter.

Further characteristics and details of the various aspects of the invention are described in the corresponding dependent claims.

Advantageously, the stereolithography machine of the invention is particularly suited to be used even by an inexpert operator like, for example, an operator of the goldworking or dentistry sector.

The said objects and advantages, together with others which will be highlighted below, are illustrated in the description of a preferred embodiment of the invention which is provided by way of non-limiting example with reference to the attached drawings, wherein.

Figure 1:
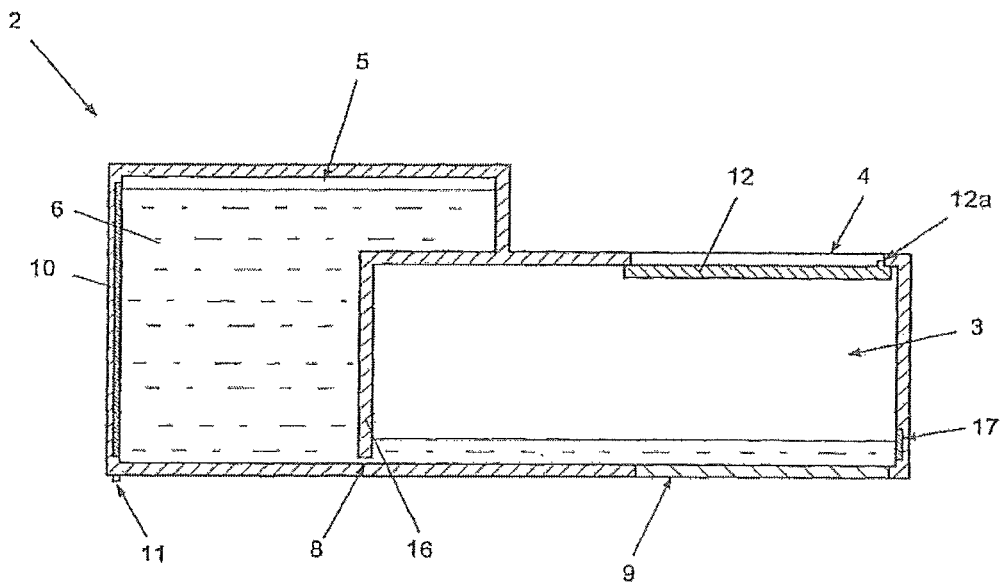
FIG. 1 shows a side sectional view of the cartridge of the invention.

The cartridge for a stereolithography machine that is the subject of the invention, indicated as a whole by 2 in FIG. 1, comprises a container 3 provided with an access opening 4.

Figure 2:
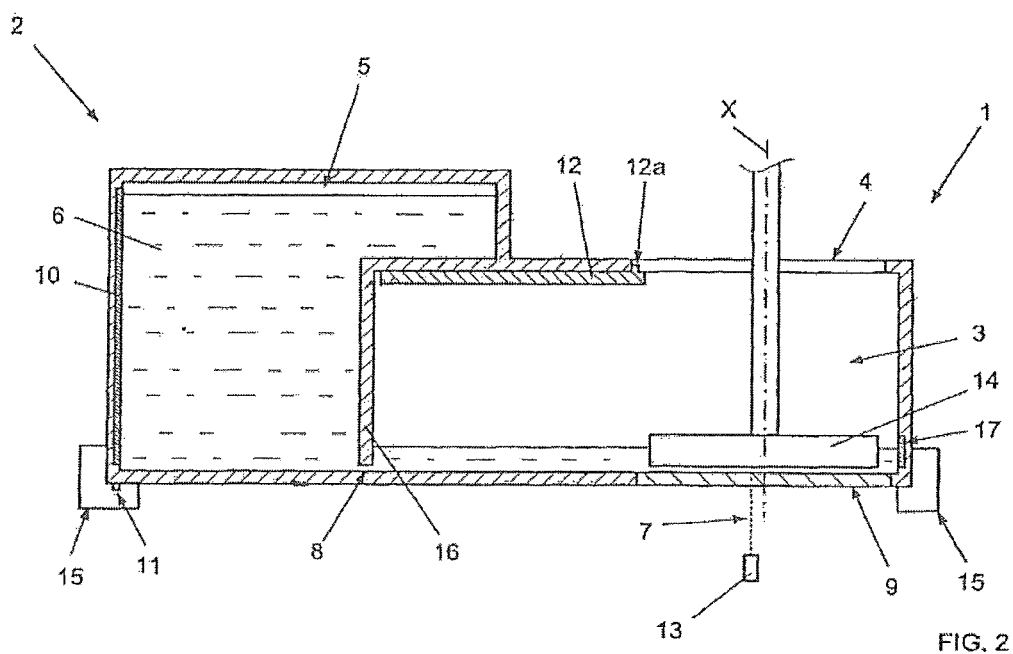
FIG. 2 shows the cartridge of FIG. 1 during use in a stereolithography machine.

The opening 4 is suited to allow a modelling platform 14 of a stereolithography machine 1 to be inserted in the container 3 when the cartridge 2 is connected to said stereolithography machine 1, as shown in FIG. 2.

The cartridge 2 also comprises a reservoir 5 suited to contain a base material 6, liquid or pasty, suited to be solidified through exposure to a predefined radiation 7.

Preferably but not necessarily, said base material 6 is a light-hardening resin or a photopolymer and the predefined radiation 7 is light.

Said reservoir 5 is permanently associated with the container 3 in such a way as to form a single body with it.

Preferably, the container 3 and the reservoir 5 belong to a single containment structure, which comprises an intermediate wall 16 that separates the container 3 from the reservoir 5.

The cartridge 2 comprises also feeding means 8 suited to transfer the base material 6 from the reservoir 5 towards the container 3.

According to the invention, the container 3 has a bottom 9 that is at least partially transparent to the predefined radiation 7 and is situated opposite the access opening 4 of the container 3.

The configuration of the access opening 4 and of the transparent bottom 9 makes it possible to use said cartridge 2 in a stereolithography machine 1 to replace the containers of the known type.

In fact, the transparent bottom 9 allows the passage of the predefined radiation 7 to obtain the solidification of the base material 6 contained in the container 3. Furthermore, the access opening 4 allows the modelling platform 14 to be inserted in the container 3 and to be moved so that the stereolithography processing can be performed.

The reservoir 5 can be previously filled with base material 6 that, through the feeding means 8, is transferred into the container 3 as it is used during the processing cycle, so as to maintain the level of the base material 6 in the container 3 substantially constant.

Therefore, the container 3 does not need to be topped up from the outside, at least until the base material 6 in the reservoir 5 has completely run out, and thus one of the objects of the invention is achieved.

In particular, to advantage, the cartridge 2 described above does not require any topping up to be performed by the operator, nor automatic feeding devices to be installed on the machine, which simplifies both the stereolithography machine 1 and its use.

Furthermore, as the feeding means 8 are incorporated in the cartridge 2, there is no need to wash them if the base material for the processing cycle has to be changed, and thus another object of the invention is achieved.

In fact, the base material can be modified by simply replacing the cartridge 2 with another analogous cartridge containing the new base material.

Preferably, the reservoir 5 is provided with means suited to insulate the base material 6 contained therein from the external environment.

Advantageously, said insulation effect makes it possible to protect the base material 6 contained in the reservoir 5 from the air and/or light of the surrounding environment.

Preferably, said insulation means comprise tight walls that delimit the reservoir 5.

In particular, the walls of the reservoir 5 are preferably opaque to the light of the surrounding environment.

Regarding the feeding means 8, these are preferably configured in such a way as to maintain the level of the base material 6 in the container 3 within a predefined interval, independently of the level of the base material 6 present in the reservoir 5.

Advantageously, this makes it possible to constantly maintain the level in the container 3 at an optimal value for processing, at the same time avoiding possible leakages of the base material 6 through the container 3.

Preferably, said feeding means 8 comprise a properly sized orifice that connects the reservoir 5 to the container 3.

In particular, said orifice can be configured in such a way as to allow the spontaneous outflow of the base material 6 when the level in the container 3 lowers and stop it once said level has been restored to its initial value.

The effect described above can be obtained, for example, by sizing the orifice in such a way as to exploit the different pressures acting on the base material 6 present in the reservoir 5 and in the container 3, as well as capillarity through the orifice.

Figure 3:
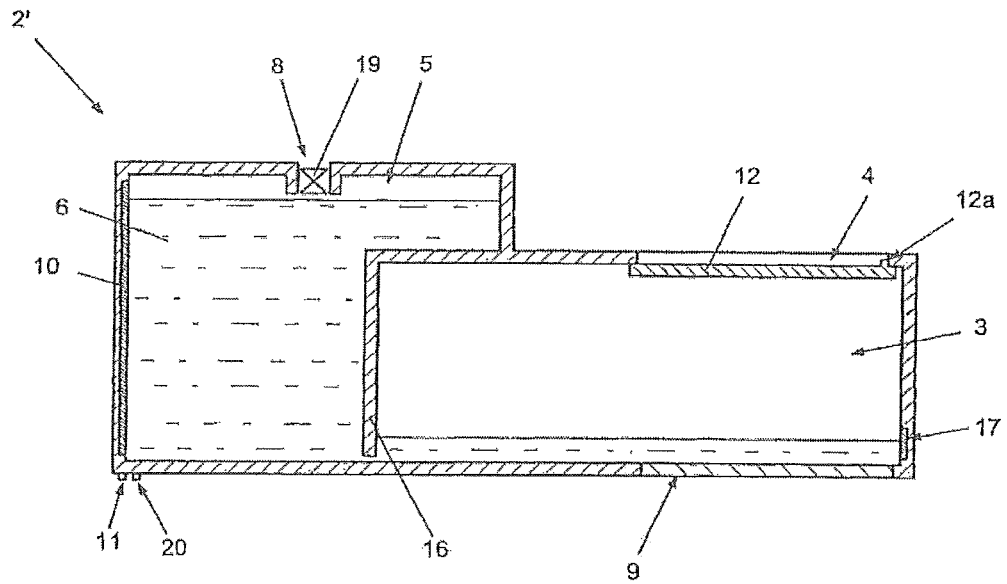
FIG. 3 shows a side sectional view of a variant embodiment of the cartridge of FIG. 1.

According to the variant embodiment of the invention shown in FIG. 3 and indicated by 2' therein, said feeding means 8 comprise valve means 19 suited to be controlled so as to allow or prevent the outflow of the base material 6 from the reservoir 5 to the container 3 according to the level of the base material 6 present in the latter.

Preferably, said valve means 19 comprise an air valve suited to allow air to get into the reservoir 5.

Figure 4:
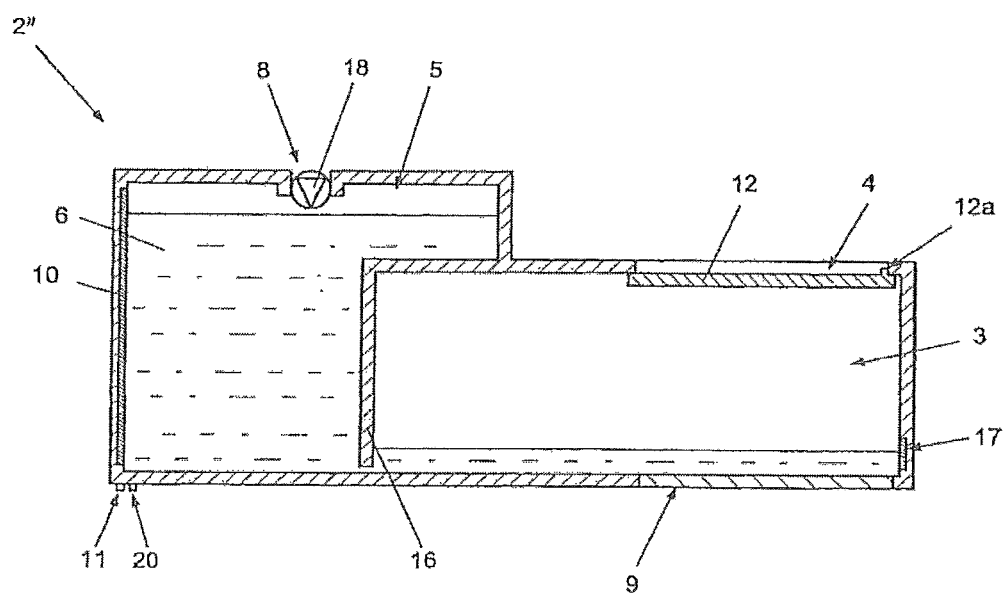
FIG. 4 shows a side sectional view of a further variant embodiment of the cartridge of FIG. 1.

According to a further variant embodiment illustrated in FIG. 4, the feeding means 8 comprise a thrust device 18 suited to thrust the base material 6 from the reservoir 5 towards the container 3.

In particular, said thrust device 18 is configured so that its action is inhibited as long as the level of the base material 6 in the container 3 remains within said predefined interval.

Preferably but not necessarily, said thrust device 18 is a pump.

Preferably, the cartridges 2' and 2" comprise power means 20 respectively suited to supply power to the valve means 19 and the thrust device 18.

Preferably, said power means 20 comprise a power supply connector that can be associated with an analogous connector belonging to the stereolithography machine. According to further variant embodiments of the invention, not illustrated in the figures, the feeding means 8 may comprise a hole suited to be closed and to allow the removable connection to the reservoir 5 of external control means configured so as to control the outflow of the base material 6 towards the container 3.

Said external control means may comprise, for example, valve means or a thrust device of the types described above.

In particular, the control means may belong to the stereolithography machine 1. Obviously, variant embodiments of the invention may comprise a combination of several feeding means selected among those described above.

Furthermore, in all the embodiments described above, the feeding means 8 may comprise sensors 17 suited to monitor the level of the base material 6 in the container 3 and to indicate any abnormal level.

In the last two embodiments, the sensors 17 can be operatively connected to the valve means 19 and/or the thrust device 18 in such a way as to control their action.

Preferably, the cartridge 2 also comprises means 10 suited to detect the level of the base material 6 contained in the reservoir 5.

Said detection means 10 make it possible to warn the operator that the base material 6 contained in the reservoir 5 has run out, so that the operator can replace the cartridge 2 when appropriate.

Therefore, the detection means 10 advantageously make it possible to further facilitate the use of the stereolithography machine 1.

Preferably, the detection means 10 are configured so as to emit an electric signal that represents the level of the base material 6 in the reservoir 5.

Said electric signal is preferably transmitted to a device that is external to the cartridge 2 through connection means 11 that may comprise, for example, a first connector suited to be removably connected to a second connector belonging to the stereolithography machine 1.

The stereolithography machine 1 is preferably equipped with warning means, not represented herein but known per se, configured in such a way that on receipt of said electric signal they can communicate to the operator that the base material 6 contained in the reservoir 5 has run out.

Preferably, the cartridge 2 comprises also a door 12 movably associated with the access opening 4 of the container 3 in such a way that it can assume a closed position, shown in FIG. 1, and an open position, shown in FIG. 2. Advantageously, closing said door 12 means making it possible to insulate the contents of the cartridge 2 completely from the external environment, for example during the periods when the cartridge 2 remains unused, in such a way as to preserve the base material 6, achieving the object to avoid its deterioration.

Still advantageously, said door 12 avoids any accidental contact between the operator and the base material 6, to further advantage of the ease of use of the machine.

Preferably, the door 12 is motorized, so that it spontaneously assumes the closed position.

Said motorization can be obtained, for example, through elastic means. According to a variant embodiment, the motorization is obtained by means of a closing device belonging to the stereolithography machine.

In this case, means suited to lock the door 12 in the closed position can be provided, which are suited to prevent the operator from opening the door 12. Said requisite can be met, for example, by configuring said locking means so that they can be released only through a tool that is automatically operated by the stereolithography machine 1 before starting the processing cycle.

In any case, the door 12 preferably comprises a shaped portion 12a suited to define the ends of stroke corresponding to said open and closed positions. Preferably but not necessarily, the volume of the reservoir 5 is included between 1 cm$^3$ and 50 cm$^3$.

The volume indicated above corresponds to the quantity of base material 6 necessary to produce a dental model of the type used in dental mechanics.

Advantageously, a cartridge 2 with a reservoir 5 in the size indicated above can be used as a disposable cartridge, further simplifying the use of the machine for an unskilled operator, while at the same time limiting the quantity of base material 6 to the indispensable minimum.

With regard to the transparent bottom 9 of the container 3, this is preferably configured so that the energy, in the form of predefined radiation 7, necessary to opacify it does not exceed 110% of the energy, in the form of the same predefined radiation 7, necessary to solidify a quantity of base material 6 corresponding to the volume of the reservoir 5.

In this way, the duration of the transparent bottom 9 is adapted to the base material 6 contained in the reservoir 5, with the advantage of limiting the cost of the transparent bottom 9 and, thus, of the cartridge 2.

According to the method for producing said cartridge 2, the reservoir 5 is preferably filled with base material 6 and the reservoir 5 and the container 3 are sealed.

Said sealing effect is obtained by packaging the cartridge 2 in a tight package that is opened by the operator before starting the processing cycle.

According to a variant embodiment of the invention, said sealing effect can be directly obtained through the walls of the cartridge 2.

In particular, the reservoir 5 can be filled through a hole that, once the filling operation has been completed, is closed in a tight and preferably fixed manner. Furthermore, the door 12 can be configured in such a way as to ensure that the cartridge remains completely tight at least until the door is opened for the first time.

Operatively, the cartridge 2 is used on a stereolithography machine 1 comprising radiation emitting means 13 suited to emit the predefined radiation 7 and a modelling platform 14 associated with power means suited to move the platform 14 along a movement trajectory X.

The machine is provided with removable connection means 15 suited to house the cartridge 2 in an operating position that is schematically illustrated in FIG. 2.

Advantageously, said connection means 15 allow the cartridge 2 to be easily installed on the stereolithography machine 1, as well as to be easily removed once the cartridge 2 has been used up.

In particular, the operating position defined by the connection means 15 for the cartridge 2 is such that the transparent bottom 9 of the cartridge is arranged along the trajectory of said predefined radiation 7 and that the access opening 4 is arranged along said moving trajectory X of the platform 14.

Preferably, the connection means 15 are provided with sensors, not illustrated in the figures but known per se, suited to detect the presence of the cartridge 2 and to indicate, if necessary, any positioning defect, thus further improving ease of use.

Once the cartridge 2 has been positioned on the machine 1, the door 12 of the container 3 is opened, preferably automatically, in order to allow the modelling platform 14 to enter the container 3.

Successively, the radiation emitting means 13 and the modelling platform 14 are operated in such a way as to obtain the three-dimensional object, according to the stereolithography methods known per se.

At the end of the processing cycle, the modelling platform 14 and, together with it, the finished object, are extracted from the container 3.

Preferably, the movable door 12 of the container 3 is closed in such a way as to protect the base material 6 remained in the cartridge 2 from the atmospheric agents, so that it can be used again at a later moment.

The stereolithography machine 1 can be configured so that it warns the operator if the level of the base material 6 present in the reservoir 5 is below a predefined threshold before starting a successive processing cycle.

According to a variant embodiment, the stereolithography machine 1 is configured so that it can calculate the quantity of base material 6 necessary to make the object, comparing it with the quantity of base material 6 available in the reservoir 5.

If the quantity of base material 6 available in the reservoir 5 is not sufficient, the stereolithography machine 1 warns the user.

The above clearly shows that the cartridge described above achieves all the set objects.

In particular, the presence of the reservoir and of the feeding means eliminates the need for the operator to periodically top up and/or empty the container of the cartridge.

Furthermore, easy connection and removal of the cartridge to/from the machine facilitate replacement when the bottom of the container becomes opaque. Said ease of use is further enhanced by the presence of means for detecting the level of the base material present in the reservoir.

Ease of use is also favoured by the fact that it is not necessary to wash the container feeding system in the case where the base material must be changed, as the feeding system is incorporated in the cartridge.

Therefore, it is sufficient to replace the cartridge with an analogous cartridge containing the new base material.

Furthermore, the possibility to close the access opening of the cartridge of the invention makes it possible to preserve the material contained therein, preventing its untimely deterioration.

The invention claimed is:

1. A stereolithography cartridge, comprising:
   a container provided with an access opening and a bottom situated opposite said access opening;
   a reservoir containing a liquid base material or a paste base material, suited to be solidified through exposure to a radiation, said reservoir being permanently associated with said container to form a single body, the reservoir and the container belonging to a single containment structure, which comprises an intermediate wall separating the container from the reservoir;
   means for feeding incorporated into the stereolithographic cartridge, the means for feeding suited to feed said base material from said reservoir towards said container, the means for feeding comprising a properly sized orifice that connects the reservoir to the container,
   wherein the bottom of said container is at least partially transparent to said radiation and wherein the cartridge is disposable, allowing for modification of the base material by replacing the cartridge in a stereolithography machine with another analogous cartridge.

2. Cartridge according to claim 1, wherein said reservoir further comprises means for insulating the base material contained therein from the external environment.

3. Cartridge according to claim 1, wherein said means for feeding are configured so as to maintain the level of said base material contained in said container within a predefined interval.

4. Cartridge according to claim 1, wherein said means for feeding further comprises a valve controlled to allow or prevent the outflow of said base material from said reservoir to said container.

5. Cartridge according to claim 1, wherein said means for feeding further comprises a thrust device suited to thrust said base material towards said container.

6. Cartridge according to claim 1, further comprising a detector suited to monitor the level of said base material contained in said reservoir.

7. Cartridge according to claim 6, wherein said detector configured to emit an electrical signal that represents the level of said base material contained in said reservoir, and further comprising a connector to allow the transmission of said electrical signal to a device external to said cartridge.

8. Cartridge according to claim 1, wherein said reservoir has a volume included between 1 $cm^3$ and 50 $cm^3$.

9. Cartridge according to claim 1, wherein said reservoir delimits a volume and said at least partially transparent bottom is opacified upon exposure to an amount of energy, in the form of the radiation, that does not exceed 110% of an amount of energy, in the form of the radiation, that is necessary to solidify an amount of base material corresponding to said volume.

10. Cartridge according to claim 1, wherein the radiation is suited to be emitted by an emitter belonging to the stereolithography machine.

11. Cartridge according to claim 1, further comprising a connector for removable connection to the stereolithography machine.

12. Cartridge according to claim 1 wherein said means for feeding is adapted to provide a layer of base material in contact with said bottom.

13. A stereolithography cartridge, comprising:
   a container provided with an access opening and a bottom situated opposite said access opening:
   a reservoir containing a liquid or paste base material suited to be solidified through exposure to a radiation, said reservoir
   being permanently associated with said container to form a single body;
   means for feeding incorporated into the stereolithographic cartridge, the means for feeding suited to feed said base material from said reservoir towards said container,
   wherein the bottom of said container is at least partially transparent to said radiation;
   a door movably associated with said access opening in such a way as to assume at least one open position and at least one closed position for said access opening insulating the base material in the cartridge from the external environment when arranged in said closed position.

14. Cartridge according to claim 13, wherein said door is motorized so as to spontaneously assume said closed position.

15. Cartridge according to claim 13 further comprising a lock to lock said door in said closed position.

16. Cartridge according to claim 13 wherein said door is configured to keep said cartridge completely tight at least until a first opening of said door.

* * * * *